March 20, 1962 E. I. WHITE 3,026,426
COUNTING CHAIN WITH RECTIFIER MEANS BETWEEN CORRESPONDING OUTPUTS OF EACH STAGE
Filed June 4, 1959
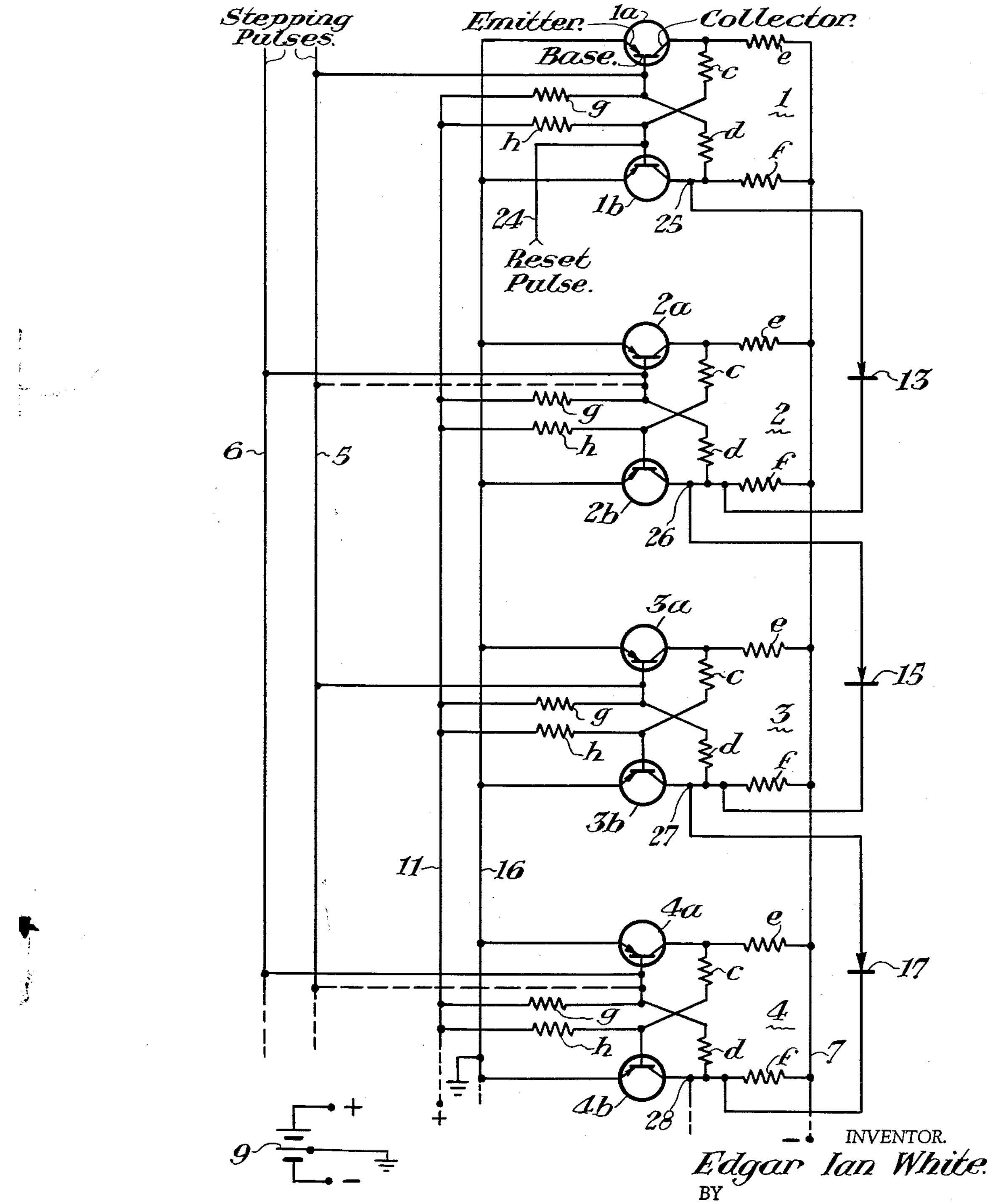
INVENTOR.
Edgar Ian White
BY
W. L. Stout
HIS ATTORNEY United States Patent Office 3,026,426

Patented Mar. 20, 1962

3,026,426

COUNTING CHAIN WITH RECTIFIER MEANS BETWEEN CORRESPONDING OUTPUTS OF EACH STAGE

Edgar Ian White, London, England, assignor to Westinghouse Brake and Signal Company Limited, London, England Filed June 4, 1959, Ser. No. 818,195
Claims priority, application Great Britain June 12, 1958
9 Claims. (Cl. 307—88.5)

My invention relates to an improved sequential counting chain having a plurality of counting stages comprising transistors.

It is an object of my invention to provide an improved counting chain including means for insuring that a stepping pulse does not enter a count into a counting stage until a count has been entered in the preceding counting stage.

It is another object of my invention to provide a counting chain including means for resetting the entire counting chain with a single pulse applied to the first stage of the counting chain.

In the attainment of the foregoing objects I provide a counting chain comprising a plurality of counting stages, each stage comprising first and second transistors connected as a multivibrator circuit having bi-stable conducting conditions. The stages are connected in cascade through appropriately poled rectifiers. One or more stepping lines are connected to the stages in parallel to apply stepping or counting pulses. The counting chain may be arranged for use with negative pulses by connecting the stepping line or lines to the first transistor in each stage, or may be arranged for use with positive pulses by connecting the stepping line or lines to the second transistor in each stage.

In one embodiment of the invention, the first transistor in each of the odd-numbered stages is connected to a first stepping line, and the first transistor in each of the even-numbered stages is connected to a second stepping line. In a second embodiment of the invention a common stepping line is employed, and the first transistor in each stage is connected to the stepping line.

Other objects and advantages of my invention will become apparent from the following description and the accompanying drawing in which like reference characters refer to like elements throughout, and in which:

The sole FIGURE is a schematic diagram of a counting chain according to my invention.

Referring to the drawing, the circuit consists of a plurality of bi-stable counting or stepping stages 1, 2, 3, 4, etc. It will be understood that the counting chain may have any desired number of counting stages, only four being shown in the drawing. Each stage comprises a first transistor indicated generally by the sub-letter *a*, and a second transistor indicated generally by the sub-letter *b*. The transistors are all similar and all include emitter, base and collector electrodes as labeled for transistor 1*a*. The transistors are connected in an Eccles-Jordan type multivibrator circuit, that is, a circuit having two alternative stable conducting conditions. P-N-P type transistors are employed; however, as is known, N-P-N type transistors may be used by appropriate changes in biasing or operating potentials. The collectors of transistors *a* are connected through respective load or biasing resistors *e* to line 7 which is in turn connected to the negative terminal of a source of potential indicated as a battery 9. The collectors of transistors *b* are likewise connected through respective load resistors *f* to line 7. Thus the collectors of all the transistors are connected in parallel to one another. The emitters of each of the transistors are connected to a common lead 16 which is connected to a center tap of battery 9, which tap is connected to ground or earth reference potential. The bases of transistors *a* are connected through respective resistors *g* to line 11 which is in turn connected to the positive terminal of battery 9. The bases of transistors *b* are likewise connected through respective resistors *h* to line 11. Thus, the bases of all the transistors are connected in parallel to one another. The transistors *a* and *b* in each stage are interconnected and biased by appropriate resistors such that in normal operation transistor *a* in each stage is in a nonconducting condition, while transistor *b* is conducting. Specifically, in each stage, the collector of transistor *a* is connected through a resistor *c* to the base of transistor *b*, and the collector of transistor *b* is connected through a resistor *d* to the base of transistor *a*.

The collector electrode of the second transistor 1*b* in stage 1 is connected to the collector electrode of the second transistor 2*b* in stage 2 through a diode rectifier 13. Rectifier 13 has its anode electrode connected to the collector of transistor 1*b* and its cathode electrode connected to the collector of transistor 2*b*. The collector electrode of the second transistor 2*b* in stage 2 is likewise connected through a rectifier 15 to the collector electrode of the second transistor 3*b* in stage 3. Rectifier 15 has its anode electrode connected to the collector of transistor 2*b* and its cathode electrode connected to the collector of transistor 3*b*. Rectifiers are connected to the following stages in a similar manner.

As noted above, the biasing adjustment of the circuit is such that in a reset condition, that is, before the start of the counting operation, the first transistor *a* in each stage is in a stable cut-off or nonconducting condition, and the second transistor *b* is in a stable conducting condition. Lines 5 and 6 connect stepping or counting pulses, from any suitable source known in the art and not shown in the drawing, to the counting chain. The counting pulses are of sufficient amplitude to change the conducting condition of the transistors in a stage, that is, of sufficient amplitude to shift the transistors from one stable conducting state to a second stable conducting state. As appreciated from the drawing, stepping line 5 is connected in parallel to the odd-numbered stages while the stepping line 6 is connected in parallel to the even-numbered stages. Since in the embodiment shown the stepping lines 5 and 6 connect negative stepping pulses to the various stages, the lines are connected in parallel to the base electrodes of the first transistors *a* of the various stages. The stepping pulses on each of lines 5 and 6 are spaced in appropriate time relation to apply the pulses to sequentially step or actuate the counting stages. Specifically, a pulse is first applied to the chain through line 5, then after an appropriate interval a second pulse is applied to the chain through line 6, and the cycle continues to repeat.

The operation of the circuit will now be described. Assume initially that a negative input pulse is applied through line 5 to the base electrode of transistor 1*a* of the stage 1. The initially nonconducting transistor 1*a* will start conducting, and as is known from Eccles-Jordan multivibrator theory, when transistor 1*a* starts conducting it causes transistor 1*b* to cease conducting or be cut off. Since at the same time a negative pulse is connected in parallel to the base electrode of transistor 3*a*, stage 3 will tend to also change its conducting condition, with transistor 3*a* tending to become conductive and transistor 3*b* tending to become nonconductive or cut off. However, as transistor 3*b* tends to be cut off, the circuit at point 27 adjacent the collector electrode of transistor 3*b* will go to a negative potential since the collector is connected to line 7 and the negative terminal of battery 9. As point 27 goes to a negative potential, the diode rectifier 15 will be biased to have a low forward impedance. With rectifier 15 biased to have a low forward impedance and since transistor 2$b$ is conducting, point 27 adjacent the conductor electrode of transistor 3$b$ will tend to be at ground reference potential. In other words, when the transistor 2$b$ and diode rectifier 15 are conducting the impedance from point 27 to line 11 and ground reference is minimum, that is, point 27 is effectively at ground reference. Since point 27 is connected through resistor $d$ to the base of transistor 3$a$, a relatively positive voltage is coupled to the base of the transistor 3$a$ tending to overcome the negative stepping pulse coupled thereto from line 5. Transistor 3$a$ thus remains in its initial or nonconducting condition and stage 3 is not stepped. The succeeding odd-numbered stages will be affected in a similar manner as stage 3. Consequently, a count will be entered only in stage 1.

Assuming a second stepping pulse is next received through line 6, the negative pulse to the base of transistor 2$a$ will cause stage 2 to shift its conducting condition such that transistor 2$a$ becomes conducting and transistor 2$b$ becomes nonconducting. Since transistor 1$b$ in stage 1 is now nonconducting the point 25 adjacent the collector electrode of transistor 1$b$ is essentially at a negative potential and thus biases diode rectifier 13 in a reverse or high impedance direction. As a result diode 13 has no effect on the operation of a circuit.

It will be appreciated that the same signal from line 6 is concurrently coupled in parallel to transistor 4$a$ in stage 4. However, as soon as transistor 4$a$ tends to shift its operating condition to be conductive and transistor 4$b$ tends to become nonconductive, the potential at point 28 adjacent the collector electrode of transistor 4$b$ will tend to be at the negative potential. This will cause rectifier 17 to be biased in a forward or low impedance direction. Since stage 3 is in a reset or nonstepped condition, transistor 3$b$ is conducting and when rectifier 17 is biased in a forward direction point 28 adjacent collector electrode of transistor 4$b$ will be at essentially ground reference potential, in a manner similar to that discussed above. The effective voltage coupled from point 28 to the base of transistor 4$a$ will nullify the effect of the negative stepping pulse coupled to the base of transistor 4$a$ by line 6. This will cause counting stage 4 to remain in its initial or nonstepped condition with transistor 4$a$ nonconducting and transistor 4$b$ conducting. The succeeding even-numbered stages will be affected in a similar manner as stage 4. Consequently, a count will be entered only in stage 2.

The counting operation is similar for the succeeding stages of the counting chain.

When stepping pulses of short duration are used it may be possible for only one stepping line to be utilized. In this case the stepping line 5 will be connected to each of the first transistors $a$ of the various stages, as shown by the dotted lines in the drawing. It should be pointed out that this arrangement is feasible only if the stepping pulses utilized are of short duration; otherwise more than one stage may change from one stable conducting state to its other stable state during each stepping pulse.

To reset the counting chain to an initial condition, a negative reset pulse from any suitable source, not shown, is applied through lead 24 to the base of the second transistor 1$b$ in the stage 1, or as is obvious, a positive pulse to the base of the first transistor 1$a$ in the stage 1 might be used. When the reset pulse is received, stage 1 will change over to its initial stable condition in which transistor 1$a$ is nonconducting and transistor 1$b$ is conducting. Point 25 adjacent the collector of transistor 1$b$ will be at approximately ground reference potential since transistor 1$b$ is conducting, while point 26 adjacent the collector of transistor 2$b$ will be at a negative potential since transistor 2$b$ is nonconducting. Rectifier 13 will thus be biased in a forward or low impedance direction and be conductive. As a consequence, a pulse at the reference potential level will be coupled to the base of transistor 2$a$, transistor 2$a$ will be cut off, and stage 2 will therefore change from its second stable conducting condition or state to its initial stable condition. This process will next be repeated in stage 3 and along all the succeeding stages in the counting chain. Thus, it will now be seen that a reset pulse applied to the first stage 1 alone results in a reset condition cascading rapidly down the whole counting chain.

If required, more than two stepping lines may be incorporated in the counting chains and may be so arranged that after a specific signal noted by a stepping pulse has been transmitted along a selected line, a series of functions can be actuated sequentially controlled by stepping pulses applied to the other lines.

Although I have herein shown and described only two embodiments of my invention, it will be understood that various modifications may be made by those skilled in the art without departing from the invention. The appended claims are therefore intended to cover all such modifications within the true spirit and scope of the invention.

Having thus described my invention, what I claim is:

1. A counting chain, comprising, in combination, a first and a second bistable multivibrator, each comprising a pair of control devices each having an input circuit and an output circuit, the output circuit of each device being coupled to the input circuit of the other device in each multivibrator so that the devices are stable in opposite states, independent circuit means for applying stepping pulses to the input circuit of only one device of each multivibrator, and means coupling the output circuit of one device of the first multivibrator to the output circuit of the corresponding device of the second multivibrator for maintaining the state of the second multivibrator during one state of the first multivibrator.

2. Apparatus of the class described, comprising, in combination, a first pair of electronic control devices each having an input circuit and an output circuit, the output circuit of each device being connected to the input circuit of the other device to form a first bistable circuit, a second pair of electronic control devices connected in the same manner as the first pair to form a second bistable circuit, an asymmetric unit coupling one of the output circuits in the first bistable circuit to the corresponding one of the output circuits in the second bistable circuit, and independent circuit means for applying stepping pulses to the input circuit of only one device in each bistable circuit.

3. In combination, a first and second pair of transistors each having a collector, an emitter, and a base, the emitters being connected in parallel to a source of voltage of a first potential, the collectors being connected through independent load impedances to a source of voltage of a second potential, the bases being connected through independent load impedances to a source of voltage of said first potential, each collector being coupled to the base of the other transistor in its pair to form a bistable circuit, means for applying pulses to the base of a first transistor in each pair, and a diode directly connected between the collectors of the other transistors in each pair.

4. A counting chain, comprising, in combination, a sequence of bistable circuits, each comprising a pair of control devices each having an input circuit and an output circuit, the output circuit of each device being coupled to the input circuit of the other device in each bistable circuit so that the devices are stable in opposite states, first independent circuit means for applying a first series of stepping pulses to the input circuit of one device of the first and every alternate bistable circuit in said sequence, second independent circuit means for applying a second series of stepping pulses alternating with said first series to the input circuit of one device of the second and every alternate bistable circuit in said sequence, and means coupling the output circuit of one device in each bistable circuit except the last to the output circuit of one device of the next bistable circuit in the sequence to inhibit a change in the state of each bistable circuit except the first in one state of the next preceding bistable circuit.

5. Apparatus of the class described, comprising, in combination, a sequence of pairs of electronic control devices each having an input circuit and an output circuit, the output circuit of each device in each pair being connected to the input circuit of the other device of the same pair to form a sequence of bistable circuits, an asymmetric unit coupling one of the output circuits in each bistable circuit except the last to the corresponding one of the output circuits in the next bistable circuit in the sequence, and independent circuit means for applying stepping pulses to the input circuit of only one device in each bistable circuit.

6. In combination, a sequence of pairs of transistors each having a collector, an emitter, and a base, the emitters being connected in parallel to a source of voltage of a first potential, the collectors being connected through independent load impedances to a source of voltage of a second potential, the bases being connected through independent load impedances to a source of voltage of said first potential, each collector being coupled to the base of the other transistor in its pair to form a bistable circuit, first means for applying a first series of pulses to the base of a first transistor in the first and each alternate pair in said sequence, second means for applying a second series of pulses alternating with said first series to the base of a first transistor in the second and each alternate pair in said sequence, and diodes directly connected between succeeding collectors of the other transistors in said sequence.

7. A counting chain, comprising, in combination, a sequence of bistable circuits, each comprising a first and a second control device each having an input circuit and an output circuit, the output circuit of each device being coupled to the input circuit of the other device in each bistable circuit so that the devices are stable in opposite states, independent circuit means for applying stepping pulses to the input circuit of the first device in each bistable circuit, means coupling the output circuit of the second device in each bistable circuit except the last to the output circuit of the second device of the next bistable circuit in the sequence to inhibit a change in the state of each bistable circuit except the first in one state of the next preceding bistable circuit, and means for applying a reset pulse to the input circuit of the second device in the first bistable circuit to restore the sequence to a common state.

8. Apparatus of the class described, comprising, in combination, a sequence of pairs each comprising a first and a second electronic control device, each device having an input circuit and an output circuit, the output circuit of each device in each pair being connected to the input circuit of the other device of the same pair to form a sequence of bistable circuits, an asymmetric unit coupling the output circuit of the second device in each bistable circuit except the last to the output circuit of the second device in the next bistable circuit in the sequence, independent circuit means for applying stepping pulses to the input circuit of the first device in each bistable circuit, and means for applying a reset pulse only to the input circuit of the second device in the first bistable circuit.

9. In combination, a sequence of pairs of first and second transistors each having a collector, an emitter, and a base, the emitters being connected in parallel to a source of voltage of a first potential, the collectors being connected through independent load impedances to a source of voltage of a second potential, the bases being connected through independent load impedances to a source of voltage of said first potential, each collector being coupled to the base of the other transistor in its pair to form a bistable circuit, first means for applying a first series of pulses to the base of the first transistor in the first and each alternate pair in said sequence, second means for applying a second series of pulses alternating with said first series to the base of the first transistor in the second and each alternate pair in said sequence, diodes directly connected between succeeding collectors of the second transistors in said sequence, and means for applying a reset pulse to the base of the second transistor in the first pair.

References Cited in the file of this patent

UNITED STATES PATENTS

| | | |
|---|---|---|
| 2,536,808 | Higinbothom | Jan. 2, 1951 |
| 2,785,304 | Bruce | Mar. 12, 1957 |
| 2,802,104 | White | Aug. 6, 1957 |